United States Patent [19]

Bunck

[11] Patent Number: 4,923,236

[45] Date of Patent: May 8, 1990

[54] FOOD RECEPTACLE CARRIER

[76] Inventor: Warren J. Bunck, RR #1, Box 94, Everest, Kans. 66424

[21] Appl. No.: 302,621

[22] Filed: Jan. 27, 1989

[51] Int. Cl.⁵ ............................................. A47G 19/08
[52] U.S. Cl. .................................... 294/161; 211/133; 211/134; 294/163
[58] Field of Search ......... 294/27.1, 32, 137, 142–144, 294/146, 159–163, 165, 167, 169; 108/91, 106, 111, 112; 206/499, 503; 211/41, 49.1, 59.4, 71, 72, 84, 113, 119, 134, 135, 133, 153

[56] References Cited

U.S. PATENT DOCUMENTS

| 419,560 | 1/1890 | Rice | 294/169 X |
|---|---|---|---|
| 613,973 | 11/1898 | Corlew | 294/169 X |
| 618,317 | 1/1899 | Anderson | 294/161 X |
| 1,093,450 | 4/1914 | McLaughlin | 294/161 X |
| 1,178,572 | 4/1916 | Burbey | 294/143 X |
| 1,597,754 | 8/1926 | Alston | 294/161 |
| 1,723,551 | 8/1929 | Linares | 294/161 X |
| 1,731,598 | 10/1929 | Stahl | 294/161 X |
| 2,448,319 | 8/1948 | Maranville | 294/161 X |
| 2,807,399 | 9/1957 | Burns | 294/169 X |
| 2,845,183 | 7/1958 | Paulsen | 294/161 X |
| 3,168,229 | 2/1965 | Heifetz | 294/137 |
| 3,186,575 | 6/1965 | Gravos et al. | 294/161 X |
| 4,682,807 | 7/1987 | Mulligan | 294/161 |

FOREIGN PATENT DOCUMENTS 655809  8/1951  United Kingdom ................ 294/161

Primary Examiner—Johnny D. Cherry

[57] ABSTRACT

A carrier for circular food receptacles. Three or more circular disks are arranged one above another to form shelves for supporting individual receptacles. Two arcuate segmental closures are swingably supported at opposed points on the disk circumference, whereby when the closure are swung open the entire space within the carrier is made accessible for insertion or removal of the food receptacles.

1 Claim, 1 Drawing Sheet

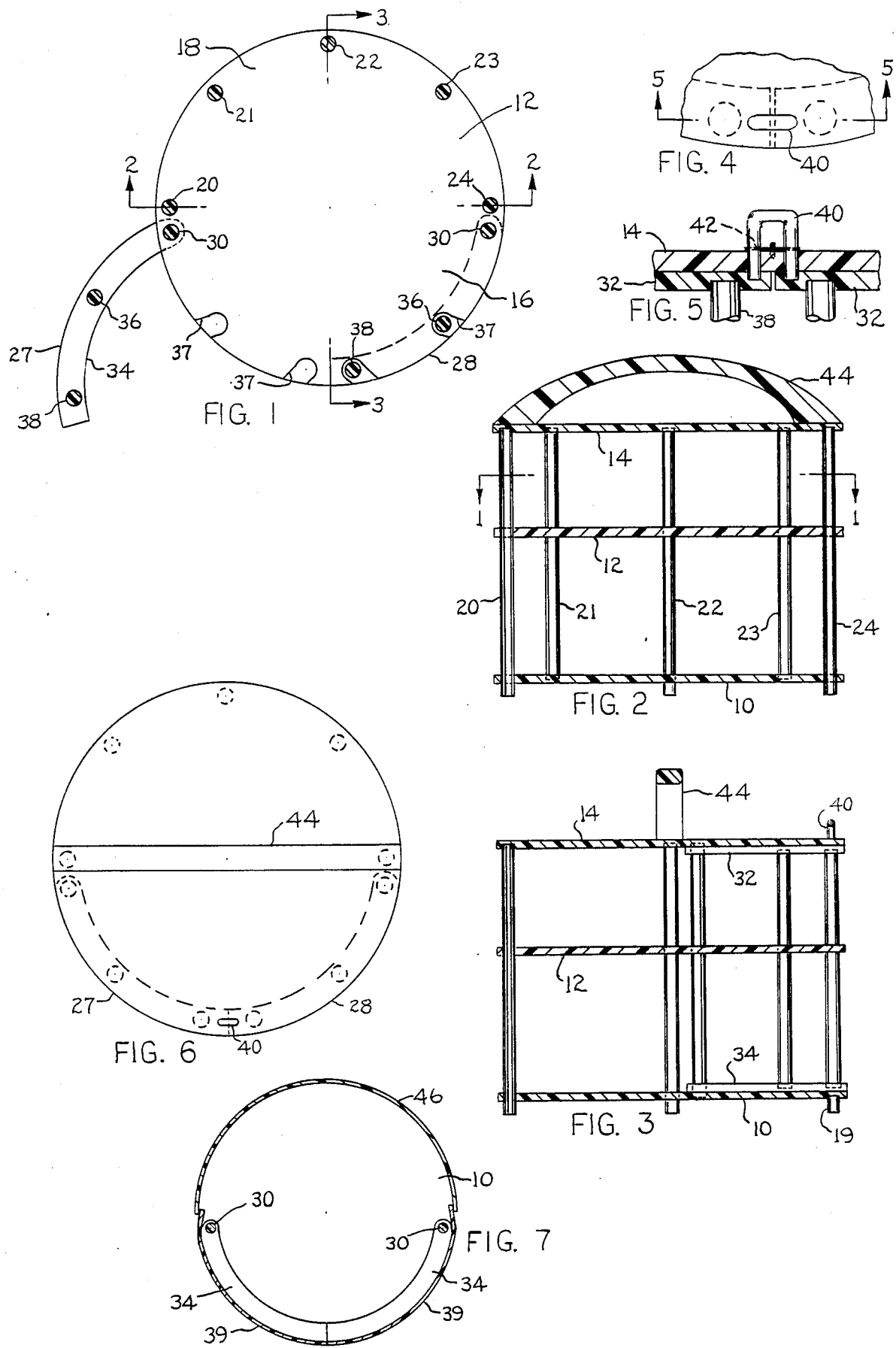

FOOD RECEPTACLE CARRIER

BACKGROUND OF THE INVENTION

This invention relates to a carrier for food receptacles, e.g. cakes, pies, salads, etc. The carrier can be used whenever it is desired to transport foods from one place to another, such as when members of a church are asked to bring individual dishes to a social hall for a church dinner.

Prior to my invention various different types of food carriers have been suggested. U.S. Pat. No. 4,682,807 issued to E. Mulligan shows a transportable cooling frame for pies or cakes. An upper annular holding member 33 and a lower holding member 46 are used to support a pie and a cake, one above the other.

U.S. Pat. No. 2,448,319 shows a pie carrier formed of wires and rods suitably bent and welded together to form shelves for pie or cake containers.

U.S. Pat. No. 3,186,575 shows a carrier for pastry containers, wherein annular rings 22 are stacked on one another to form a series of annular ledges; rim areas of pie containers seat on the ledges. A cylindrical cover 32 can be slid down over the stacked assembly.

SUMMARY OF THE INVENTION

This invention contemplates a circular (cylindrical) food receptacle carrier having at least two shelves for supporting circular food receptacles, e.g. pies or cakes. Two arcuate segmental closures are swingably supported at opposed points on the circumference of the carrier. The closures may be swung open to gain access to the space within the carrier.

One object of the invention is to provide a carrier wherein the pie, cake, etc. is visibly displayed.

Another object is to provide a carrier having vertically-spaced shelves that permit individual food receptacles to be removed from the carrier without disturbing other receptacles.

A further object is to provide a carrier that has a symmetrical appearance, i.e. generally the same appearance when viewed from any direction.

An additional object is to provide an economically-constructed carrier that can be manufactured without large tooling expense.

THE DRAWINGS

FIG. 1 is a sectional view through a carrier embodying the invention. FIG. 1 is taken on line 1—1 in FIG. 2.

FIG. 2 is a sectional view on line 2—2 in FIG. 1.

FIG. 3 is a sectional view on line 3—3 in FIG. 1.

FIG. 4 is a top plan view of structural detail used in the FIG. 1 carrier.

FIG. 5 is a fragmentary sectional view taken on line 5—5 in FIG. 4.

FIG. 6 is a top plan view of the FIG. 1 carrier.

FIG. 7 is a sectional view taken through another carrier embodying the invention.

DESCRIPTION OF A PREFERRED EMBODIMENT OF THE INVENTION

FIGS. 1 through 3 show a carrier for two circular food receptacles. The receptacles do not appear in the drawings. Such receptacles would in practice be supported on a lower circular disk 10 and an intermediate circular disk 12. Another top circular disk 14 is located above disk 12.

In FIG. 1, section line 2—2 may be viewed as an imaginary midplane separating the disk space into a front half 16 and rear half 18. Five cylindrical rods 20, 21, 22, 23 and 24 extend from bottom disk 10 through intermediate disk 12 and into top disk 14. These rods act as vertical supports to rigidly retain the disks in vertically-spaced relationship. The five rods are preferably equally spaced in a circumferential sense. Rods 20, 22 and 24 extend through and beyond disk 10 to form support feet for the carrier. A fourth support foot 19 is secured to disk 10 (FIG. 3).

The carrier is provided with two arcuate segmental closures, designated by numerals 27 and 28; the closures are of equal size and shape. Each closure comprises a vertical shaft 30 located near the midplane defined by section line 2—2 (FIG. 1). The ends of each shaft 30 extend into sockets formed in disks 10 and 14, such that the shaft can rotate around the shaft axis.

Each shaft 30 has connected thereto an upper arcuate frame member 32 and a lower arcuate frame member 34. Two vertical posts 36 and 38 extend vertically between the two frame members. Notches 37 may be formed in edge areas of disk 12 to accommodate posts 36 and 38. The assembly comprised of shaft 30, frame members 32 and 34, and posts 36 and 38, forms a rigid arcuate closure. There are two such closures; each closure can be swung around the axis of the associated shaft 30. In FIG. 1, the left hand closure is shown open, and the right hand closure closed. When both closures are swung open the entire front half of the disk space is available to receive two circular food receptacles (one receptacle on disk 10 and the other receptacle on disk 12).

The drawings show a carrier formed by three circular disks. However, additional disks could be added to increase the capacity of the carrier, if so desired. For individual family use a capacity of two or three receptacles is believed sufficient. The disks need not be evenly spaced. As seen in FIGS. 2 and 3, disk 12 is relatively close to top disk 14 and relatively far away from bottom disk 10. Thus, the bottom disk can support a relatively deep food receptacle (or large cake), whereas the intermediate disk can support a relatively shallow food receptacle. The arrangement economizes on space and construction materials.

Any suitable latch means may be used to hold the closures in their closed position. As shown in FIGS. 5 and 6, the latch means comprises a U-shaped pin 40 having pin sections slidably positioned in vertical openings in top disk 14; the lower ends of the pin sections extend into recesses in the two upper frame members 32 of the two closures. A small straight wire spring 42 is affixed at its midpoint to top disk 14, with end sections of the wire extending into small openings in pin 40. The wire spring keeps pin 40 against dislodgement out of the recess in frame members 32. However, the U-shaped pin can be manually pulled upwardly at any time to unlatch both of the arcuate closures.

The carrier is preferably provided with a handle for ease in carrying the closure from place to place. FIGS. 2 and 3 show a handle 44 that can be used. Other handle structures are possible.

The arrangement of FIGS. 1 through 3 is an open arrangement wherein atmospheric air can circulate freely into or out of the space within the carrier. FIG. 7 shows a form of the invention wherein the carrier space is closed, such that free flow of air into or out of the carrier is prevented or minimized. In this form of the invention the disk construction can be the same as that shown in FIGS. 1 through 3. However, the five support rods 20, 21, 22, 23 and 24 are replaced by an arcuate transparent sheet 46. Sheet 46 extends from the top disk 14 to the bottom disk 10, with edges of the disks being adhesively joined to inner surface areas of sheet 46.

Each segmental closure comprises a vertical shaft 30 and two arcuate frame members similar to previously referenced members 32 and 34. An arcuate transparent sheet 39 is adhesively secured to outer edge areas of the frame members to complete the closure. The two closures can be swung open in the same fashion as the closures shown in FIG. 1.

The drawings show two forms that the invention can take. Other forms are possible.

I claim:

1. A carrier for circular food receptacles comprising: a circular flat bottom disk; a circular flat top disk; a circular flat intermediate disk; said disks being vertically aligned and having an imaginary vertical midplane separating each disk into a front disk half and a rear disk half; each disk having an endless circular circumferential edge that forms a front half edge and a rear half edge;

a number of vertical support rods extending from the bottom disk through the intermediate disk and into the top disk to rigidly retain the three disks in vertically spaced relationship; said rods being circumferentially spaced around the rear half of each disk so that the front half of each disk is open; said rods being located within the circular plan dimensions of the circular disks near the disk circumferential edges;

two equal size arcuate segmental closures extending along the front circumferential edges of the circular disks;

each arcuate closure comprising a vertical shaft located near the edges of the circular disks in close adjacency to the aforementioned disk midplane, each vertical shaft extending from the bottom disk through the intermediate disk and into the top disk to define a closure swing axis, upper and lower arcuate frame members extending from the vertical shaft in near adjacency to the top disk and bottom disk, and two circumferentially spaced vertical posts extending between said arcuate frame members to complete the arcuate closure;

the two equal size arcuate closures spanning substantially the entire front half of each disk circumferential edge so that when the two closures are swung open the intermediate disk and bottom disk are enabled to receive food receptacles thereon;

said intermediate disk having notches in its circumferential edge to accommodate the vertical posts when the closures are swung to their closed positions.

* * * * *